(12) United States Patent
Wang et al.

(10) Patent No.: US 9,720,431 B2
(45) Date of Patent: Aug. 1, 2017

(54) METHOD FOR OPTIMIZING THE FLEXIBLE CONSTRAINTS OF AN ELECTRIC POWER SYSTEM

(71) Applicant: SHANGHAI JIAO TONG UNIVERSITY, Shanghai (CN)

(72) Inventors: Chengmin Wang, Shanghai (CN); Weiqing Sun, Shanghai (CN); Tao Yi, Shanghai (CN); Hongzhong Li, Shanghai (CN); Yong Liu, Shanghai (CN); Jianmin Duan, Shanghai (CN); Dingyao Xiao, Shanghai (CN)

(73) Assignee: SHANGHAI JIAO TONG UNIVERSITY, Shanghai (CN)

( * ) Notice: Subject to any disclaimer, the term of this patent is extended or adjusted under 35 U.S.C. 154(b) by 485 days.

(21) Appl. No.: 14/470,504

(22) Filed: Aug. 27, 2014

(65) Prior Publication Data

US 2015/0355655 A1    Dec. 10, 2015

Related U.S. Application Data

(63) Continuation of application No. PCT/CN2014/081160, filed on Jun. 30, 2014.

(30) Foreign Application Priority Data

Jun. 6, 2014   (CN) .......................... 2014 1 0250893

(51) Int. Cl.
   *G06Q 50/06*    (2012.01)
   *G06F 17/50*    (2006.01)
   (Continued)

(52) U.S. Cl.
   CPC ............. *G05F 1/66* (2013.01); *G05B 13/041* (2013.01); *G05B 17/02* (2013.01); *G06F 17/10* (2013.01)

(58) Field of Classification Search
   CPC .... G05F 1/66; G06F 17/5009; G06F 2217/78; G06Q 10/06; G06Q 50/06; G05B 13/041; G05B 17/02; G05B 17/10; G05B 15/02
   See application file for complete search history.

(56) References Cited

U.S. PATENT DOCUMENTS 8,050,899 B2 * 11/2011 Giguere ................. G06Q 10/06
                                                       60/39.34
8,560,134 B1 * 10/2013 Lee ..................... H02J 13/0086
                                                       700/28

(Continued)

FOREIGN PATENT DOCUMENTS

| CN | 101478160 | 7/2009 |
| CN | 101820172 | 9/2010 |
| CN | 102867240 | 1/2013 |

OTHER PUBLICATIONS

Deng et al., MultiGreen: cost-minimizing multi-source datacenter power supply with online control, May 2013, 11 pages.*

(Continued)

*Primary Examiner* — Thuy Dao
(74) *Attorney, Agent, or Firm* — Hamre, Schumann, Mueller & Larson, P.C.

(57) ABSTRACT

A method for optimizing the flexible constraints of an electric power system includes a step S1 of expressing the total power generation cost of the electric power system by using the sum of quadratic functions of active power outputs of all generator sets in the system and constructing an objective function, a step S2 of selecting a multi-dimensional flexible optimization model or a flexible power generation cost optimization model according to the practical situation of the electric power system and the practical purpose of optimization, a step S3 of determining the (Continued)

operating conditions of the electric power system, and a step S4 of carrying out load flow calculation.

5 Claims, 1 Drawing Sheet

(51) Int. Cl.
| | |
|---|---|
| *G06F 1/26* | (2006.01) |
| *G05F 1/66* | (2006.01) |
| *G05B 13/04* | (2006.01) |
| *G06F 17/10* | (2006.01) |
| *G05B 17/02* | (2006.01) |

(56) References Cited

U.S. PATENT DOCUMENTS

| | | | | |
|---|---|---|---|---|
| 8,565,928 | B2* | 10/2013 | Venkatakrishnan | G06Q 10/06 700/285 |
| 9,093,840 | B2* | 7/2015 | Sun | H02J 3/00 |
| 9,098,817 | B2* | 8/2015 | Asghari | G06Q 10/06315 |
| 9,098,876 | B2* | 8/2015 | Steven | G06Q 30/0283 |
| 9,281,689 | B2* | 3/2016 | Boardman | H02J 3/26 |
| 9,336,338 | B2* | 5/2016 | Legbedji | G06Q 50/06 |
| 9,354,641 | B2* | 5/2016 | Peskin | G05B 13/04 |
| 9,466,034 | B2* | 10/2016 | Viassolo | G06Q 10/00 |
| 9,509,176 | B2* | 11/2016 | Carter | G06Q 10/06 |
| 2005/0135031 | A1 | 6/2005 | Colby et al. | |
| 2013/0346768 | A1* | 12/2013 | Forbes, Jr. | G06F 1/266 713/310 |
| 2014/0046495 | A1* | 2/2014 | Magnussen | H02J 3/14 700/291 |
| 2015/0378381 | A1* | 12/2015 | Tinnakornsrisuphap | G05F 1/66 700/276 |
| 2016/0224045 | A1* | 8/2016 | Wong | G05F 1/66 |
| 2016/0334768 | A1* | 11/2016 | Schwarz | G06Q 50/06 |

OTHER PUBLICATIONS

Urgaonkar et al., Optimal power cost management using stored energy in data centers, Jun. 2011, 12 pages.*

Huang et al., Minimizing electricity costs by sharing energy in sustainable microgrids, Nov. 2014, 10 pages.*

Shang et al., "Coordination theory of electric power system optimal dispatch considering security and economics," Automation of Electric Power System, Mar. 25, 2007, vol. 31, No. 6, pp. 28-33 (English language abstract provided).

Hu et al., "Optimal dispatch in wind integrated system considering operation reliability," Transactions of China Electrotechnical Society, May 2013, vol. 28, No. 5, pp. 58-65 (English language abstract provided).

English language translation of International Search Report of PCT/CN2014/081160, dated Feb. 27, 2015, 2 pages total.

Sun et al., "A power system optimization model adopting flexible expression of rigid constraints," Power System Technology, vol. 36, No. 3, 2012, pp. 120-126 (English language abstract provided).

* cited by examiner

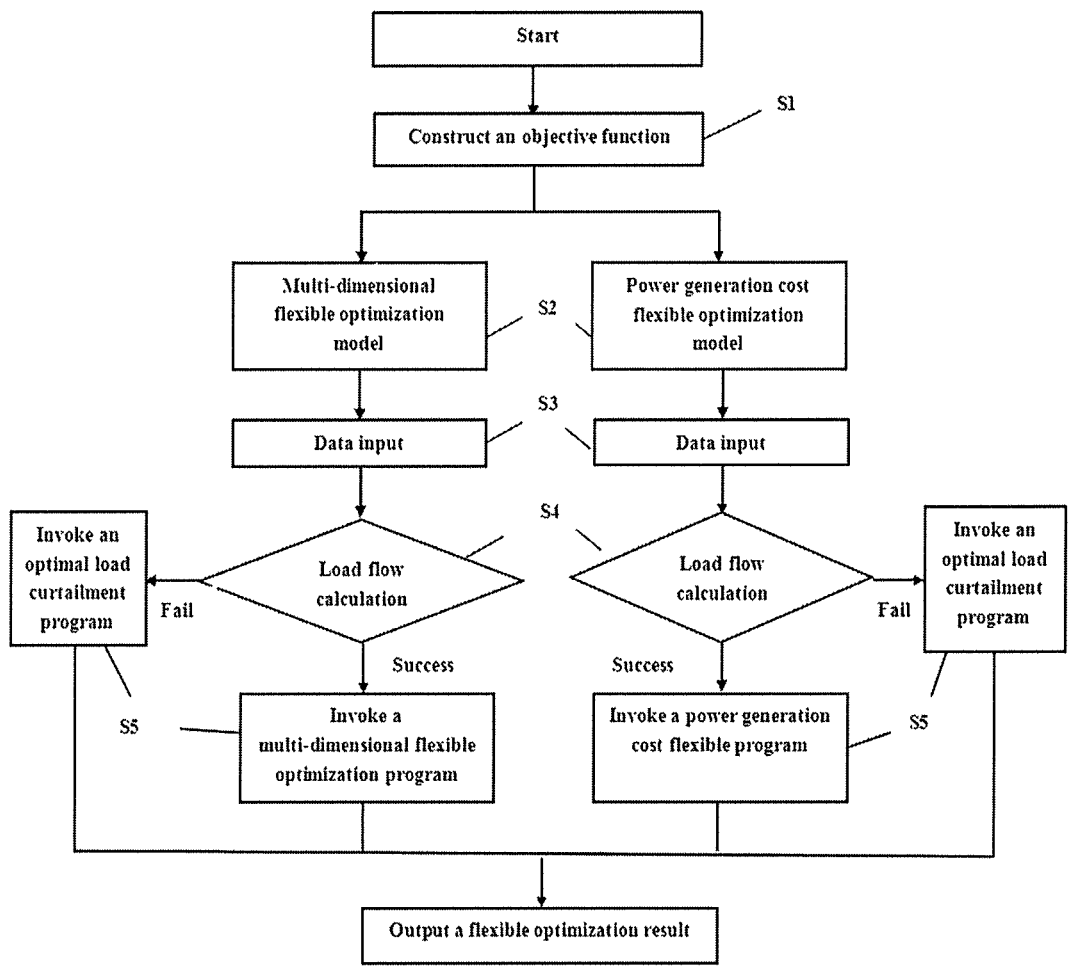

METHOD FOR OPTIMIZING THE FLEXIBLE CONSTRAINTS OF AN ELECTRIC POWER SYSTEM

BACKGROUND

Technical Field

This disclosure relates to an information processing method of an electric power system, and in particular relates to a method for optimizing flexible constraints of an electric power system. This disclosure may require a certain adjustment margins of the electric power system, which means the system should remain some backup capacity both in real and reactive power. Meanwhile, as the generation costs of the systems is also considered, in some embodiments, the disclosure is suitable for high voltage transmission systems, but not low voltage distribution systems without or with very few generators.

2. Description of Related Art

The optimization of modern electric power systems involves various fields of study and wide study contents; and electric power system load flow analysis, mathematical optimization theory, operational research, system engineering and the like are essential subjects in study, and therefore, the optimization problem of electric power systems becomes a complex and huge problem.

With the development of the smart power grid, modern electric power systems are being developed toward large systems, ultrahigh voltage, long distance, and large capacity. The integration of large scale renewable energy sources has resulted in more complex power grid structure and operation modes, various constraint conditions of system operations are increasingly intensified, and the requirements for the constraint conditions are more detailed and harsher. According to the traditional electric power system optimization analysis, the safety and reliability of system operations is generally guaranteed by virtue of the rigid constraints set for system parameters, but, the setting value of the boundary of the rigid constraints is not flexible enough and often tends to be conservative.

Under the circumstances, many new characteristics and requirements appear in the optimization problem of the electric power systems, and if a traditional optimization model and a conventional optimization method are adopted, the economic efficiency, safety, and reliability of system operation cannot be taken into account easily, and the optimal operation point is difficult to find. For example, the documents *Operation Reliability Considering Optimized Dispatching of Wind-Power Systems* (Transactions of China Electrotechnical Society, 2013, 28(5): pp. 58-65) and *Safety and Economy Considering Coordination Theory of Optimized Dispatching of Electric Power Systems* (Automation of Electric Power Systems, 2007, 31(6): pp. 28-33) both fail in taking comprehensive optimization of economic efficiency, safety, and reliability into full account.

SUMMARY

The disclosure can help overcoming the shortcomings of the prior art and provide a method for optimizing flexible constraints of an electric power system by taking comprehensive optimization of economic efficiency, safety, and reliability into full account.

Some embodiments disclose a method for optimizing the flexible constraints of an electric power system including the following steps: S1, the total power generation cost f' of the electric power system is expressed by using the sum of quadratic functions of active power outputs of all generator sets in the system in a flexible formula as follows:

$$f' = \sum_{i=1}^{N_g}(a_i P_{Gi}^2 + b_i P_{Gi} + c_i) = f_0 + \delta_f \Delta f, \quad (1)$$

wherein $N_g$ represents the total number of the generators of the system, $i=1, 2, \ldots, N_g$; $a_i$, $b_i$ and $c_i$ are the power generation coefficients of the generator set i; $P_{Gi}$ is the active power of the generator i; $f_0$ represents the minimum expected value of the total power generation cost of the system, $\Delta f$ represents the acceptable maximum increment of the total power generation cost of the system; $\delta_f$ is the flexible index of the power generation cost of the system, and the numerical area of the flexible index is as follows: $\delta_f \in [0,1]$; S2, a multi-dimensional flexible optimization model or a flexible power generation cost optimization model is selected according to the practical situation of the electric power system and the practical purpose of optimization; S3, the operating conditions, including a power grid structure, and voltages and powers of the generators of the electric power system are determined; S4, load flow calculation is carried out based on the operating conditions of the electric power system; and S5, if the load flow calculation is successful, corresponding optimization calculation is carried out according to the flexible multi-dimensional or flexible power generation cost model selected in the step S2 to obtain a comprehensive flexible optimization result or the optimal power generation cost, and if the load flow calculation fails, corresponding optimization calculation is carried out according to an optimal load curtailment model to obtain the optimal load curtailment.

The multi-dimensional flexible optimization model is as follows:

$$\min f(\delta) = \delta_f^2 + \frac{1}{N}\sum_{k=1}^{N}\delta_{Lk}^2 - \frac{1}{N_g}\sum_{i=1}^{N_g}\delta_{Gi}^2 - \frac{1}{N}\sum_{k=1}^{N}\delta_{Vk}^2 - \frac{1}{L}\sum_{l=1}^{L}\delta_{Fl}^2 \quad (1)$$

$$\text{s.t.} \sum_{i=1}^{N_g}(a_i P_{Gi}^2 + b_i P_{Gi} + c_i) = f_0 + \delta_f \Delta f$$

$$P_{Gk} - V_k \sum_{j \in k} V_j(G_{kj}\cos\theta_{kj} + B_{kj}\sin\theta_{kj}) = P_{Lk} - \delta_{Lk}\Delta P_{Lk}$$

$$Q_{Gk} - V_k \sum_{j \in k} V_j(G_{kj}\sin\theta_{kj} - B_{kj}\cos\theta_{kj}) = Q_{Lk} - \delta_{Lk}\Delta Q_{Lk}$$

$$P_{Gi}^{min} + \delta_{Gi}\Delta P_{Gi}^{min} \leq P_{Gi} \leq P_{Gi}^{max} - \delta_{Gi}\Delta P_{Gi}^{max}$$

$$Q_{Gi}^{min} + \delta_{Gi}\Delta Q_{Gi}^{min} \leq Q_{Gi} \leq Q_{Gi}^{max} - \delta_{Gi}\Delta Q_{Gi}^{max}$$

$$V_k^{min} + \delta_{Vk}\Delta V_k^{min} \leq V_k \leq V_k^{max} - \delta_{Vk}\Delta V_k^{max}$$

$$S_l \leq S_l^{max} - \delta_{Fl}\Delta S_l^{max}$$

$$0 \leq \delta_f, \delta_{Lk}, \delta_{Gi}, \delta_{Vk}, \delta_{Fl} \leq 1$$

$$i = 1, 2, \ldots, N_g; k, j = 1, 2, \ldots, N; l = 1, 2, \ldots, L,$$

wherein $\delta_{Lk}$ represents the flexible load index of a node k, $\delta_{Gi}$ represents the flexible index of the power output of generator i, $\delta_{Vk}$ represents the flexible voltage index of the node k, $\delta_{Fl}$ represents the flexible load flow index of the line l, N represents the total number of the nodes of the system, L represents the total number of the lines of the system, $P_{Gk}$ and $Q_{Gk}$ represent the active power and the reactive power of the node k, respectively, $P_{Lk}$ and $Q_{Lk}$ represent the active load and the reactive load of the node k, respectively, $V_k$ and $V_j$ represent the voltages of the nodes k and j, respectively, $G_{kj}$, $B_{kj}$ and $\theta_{kj}$ represent electric conductance, electrical susceptibility, and phase angle difference between the nodes k and j, respectively, $\Delta P_{Lk}$ and $\Delta Q_{Lk}$ represent the deviations of the active load and the reactive load of the node k, respectively, $P_{Gi}$, $P_{Gi}^{max}$ and $P_{Gi}^{min}$ represent the active power of the generator i and the upper and lower limits of the active power, respectively, $\Delta P_{Gi}^{max}$ and $\Delta P_{Gi}^{min}$ represent the maximum allowable threshold-crossing values of $P_{Gi}^{max}$ and $P_{Gi}^{min}$, respectively, $Q_{Gi}$, $Q_{Gi}^{max}$ and $Q_{Gi}^{min}$ represent the reactive power of the generator i and the upper and lower limits of the reactive power, respectively, $\Delta Q_{Gi}^{max}$ and $\Delta Q_{Gi}^{min}$ represent the maximum allowable threshold-crossing values of $Q_{Gi}^{max}$ and $Q_{Gi}^{min}$, respectively, $V_k$, $V_k^{max}$ and $V_k^{min}$ represent the voltage of the node k and the upper and lower limits of the voltage, respectively, $\Delta V_k^{max}$ and $\Delta V_k^{min}$ represent the maximum allowable threshold-crossing values of $V_k^{max}$ and $V_k^{min}$, respectively, $S_l$ and $S_l^{max}$ represent the load flow value and the threshold of the line l, respectively, and $\Delta S_l^{max}$ represents the maximum allowable threshold-crossing value of $S_l^{max}$.

Thus, the first constraint refers to the flexible constrain of system generation costs; the second and third refer to real and reactive power balance of the nodes respectively; the fourth and fifth refer to the flexible constraints of the generator real and reactive power outputs respectively; the sixth refers to the flexible voltage constraints of the nodes; the seventh refers to the flexible constraints of the transmission lines; and the eighth refers to the constraints of the flexible indices.

The flexible power generation cost optimization model is as follows:

$$\min f(\delta) = \delta_f^2 \qquad (3)$$

$$\text{s.t.} \sum_{i=1}^{N_g} (a_i P_{Gi}^2 + b_i P_{Gi} + c_i) = f_0 + \delta_f \Delta f$$

$$P_{Gk} - V_k \sum_{j \in k} V_j (G_{kj} \cos\theta_{kj} + B_{kj} \sin\theta_{kj}) = P_{Lk}$$

$$Q_{Gk} - V_k \sum_{j \in k} V_j (G_{kj} \sin\theta_{kj} - B_{kj} \cos\theta_{kj}) = Q_{Lk}$$

$$P_{Gi}^{min} \leq P_{Gi} \leq P_{Gi}^{max}$$

$$Q_{Gi}^{min} \leq Q_{Gi} \leq Q_{Gi}^{max}$$

$$V_k^{min} \leq V_k \leq V_k^{max}$$

$$S_l \leq S_l^{max}$$

$$0 \leq \delta_f \leq 1$$

$$i = 1, 2, \ldots, N_g; k, j = 1, 2, \ldots, N; l = 1, 2, \ldots, L,$$

wherein N represents the total number of the nodes of the system, L represents the total number of the lines of the system, $P_{Gk}$ and $Q_{Gk}$ represent the active power and the reactive power of the node k, respectively, $P_{Lk}$ and $Q_{Lk}$ represent the active load and the reactive load of the node k, respectively, $V_k$ and $V_j$ represent the voltages of the nodes k and j, respectively, $G_{kj}$, $B_{kj}$ and $\theta_{kj}$ represent electric conductance, electrical susceptibility, and phase angle difference between the nodes k and j, respectively, $P_{Gi}$, $P_{Gi}^{max}$ and $P_{Gi}^{min}$ represent the active power of the generator i and the upper and lower limits of the active power, respectively, $Q_{Gi}$, $Q_{Gi}^{max}$ and $Q_{Gi}^{min}$ represent the reactive power of the generator i and the upper and lower limits of the reactive power, respectively, $V_k$, $V_k^{max}$ and $V_k^{min}$ represent the voltage of the node k and the upper and lower limits of the voltage, respectively, and $S_l$ and $S_l^{max}$ represent the load flow value and the threshold of the line l, respectively.

The optimal load curtailment is as follows:

$$\min \sum_{k=1}^{N} \delta_{Lk} \Delta P_{Lk} \qquad (4)$$

$$\text{s.t.} \quad P_{Gk} - V_k \sum_{j \in k} V_j (G_{kj} \cos\theta_{kj} + B_{kj} \sin\theta_{kj}) = P_{Lk} - \delta_{Lk} \Delta P_{Lk}$$

$$Q_{Gk} - V_k \sum_{j \in k} V_j (G_{kj} \sin\theta_{kj} - B_{kj} \cos\theta_{kj}) = Q_{Lk} - \delta_{Lk} \Delta Q_{Lk}$$

$$P_{Gi}^{min} \leq P_{Gi} \leq P_{Gi}^{max}$$

$$Q_{Gi}^{min} \leq Q_{Gi} \leq Q_{Gi}^{max}$$

$$V_k^{min} \leq V_k \leq V_k^{max}$$

$$S_l \leq S_l^{max}$$

$$i = 1, 2, \ldots, N_g; k, j = 1, 2, \ldots, N; l = 1, 2, \ldots, L,$$

wherein $\delta_{Lk}$ represents the flexible load index of a node k, N represents the total number of the nodes of the system, L represents the total number of the lines of the system, $P_{Gk}$ and $Q_{Gk}$ represent the active power and the reactive power of the node k, respectively, $P_{Lk}$ and $Q_{Lk}$ represent the active load and the reactive load of the node k, respectively, $V_k$ and $V_j$ represent the voltages of the nodes k and j, respectively, $G_{kj}$, $B_{kj}$ and $\theta_{kj}$ represent electric conductance, electrical susceptibility, and phase angle difference between the nodes k and j, respectively, $\Delta P_{Lk}$ and $\Delta Q_{Lk}$ represent the deviations of the active load and the reactive load of the node k, respectively, $P_{Gi}$, $P_{Gi}^{max}$ and $P_{Gi}^{min}$ represent the active power of the generator i and the upper and lower limits of the active power, respectively, $Q_{Gi}$, $Q_{Gi}^{max}$ and $Q_{Gi}^{min}$ represent the reactive power of the generator i and the upper and lower limits of the reactive power, respectively, $V_k$, $V_k^{max}$ and $V_k^{min}$ represent the voltage of the node k and the upper and lower limits of the voltage, respectively, and $S_l$ and $S_l^{max}$ represent the load flow value and the threshold of the line l, respectively.

The corresponding optimization specifically includes the steps of 501, constructing a Lagrange objective function according to the corresponding flexible multi-dimensional, flexible power generation cost, or optimal load curtailment model, 502, obtaining a Kuhn-Tucker condition corresponding to the optimal solution of the Lagrange objective function, and 503, solving by virtue of a Newton method to obtain the optimal solution of the model.

Compared with the prior art, the method for optimizing the flexible constraints of the electric power system has the following advantages that: 1) the disclosure provides a flexible optimization method of the electric power system aimed at the issue of the rigid constraint boundary of the existing method for optimizing the operation of the electric power system being insufficient, and the provided flexible optimization method of the electric power system intends to complement and perfect the existing operation optimization method of the electric power system. The flexible optimization method of the electric power system is capable of expanding the safety constraint boundary of the electric power system by a flexible analysis method by constructing a multi-dimensional flexible optimization model, a flexible power generation cost optimization model and an optimal load curtailment model for the optimal dispatching of the smart grid, and therefore, the restriction of the rigid constraints is effectively improved, the optimal operation point taking the economic efficiency, safety, and reliability of system operation into account in the operation process of the electric power system is found, and the safety and reliability are improved at an economic cost as low as possible. 2) The method takes the calculation of the optimal solution of the load curtailment into account if the load flow calculation fails in the flexible optimization process, and therefore, the safety and reliability of the optimization process are improved. According to the method, when an original optimal load flow problem is insoluble, the optimal load curtailment model can be employed, and the load curtailment measure is adopted to recover the system to a feasible region at the minimum load loss cost without considering the economic efficiency of system operation and the flexibility of inequality constraints.

BRIEF DESCRIPTION OF THE DRAWINGS

FIG. 1 is the flow chart of the method for optimizing the flexible constraints.

DETAILED DESCRIPTION

The method for optimizing the flexible constraints of the electric power system is explained in detail in combination with the FIGURE and the specific embodiment below. The embodiment is implemented under the premise of the technical scheme of the method for optimizing the flexible constraints of the electric power system, and detailed implementation mode and specific operation process are provided, but the scope of protection of the method for optimizing the flexible constraints of the electric power system is not limited to the following embodiment.

As shown in FIG. 1, a method for optimizing the flexible constraints of an electric power system includes: step S1, generally, the total power generation cost of the system is taken as the standard for evaluating the economic efficiency of system operation in the traditional economical dispatching problem of the electric power system; the total power generation cost f' of the electric power system is expressed by using the sum of quadratic functions of active power outputs of all generator sets in the system in a flexible formula as follows:

$$f' = \sum_{i=1}^{N_g} (a_i P_{gi}^2 + b_i P_{Gi} + c_i) = f_0 + \delta_f \Delta f, \qquad (1)$$

wherein $N_g$ represents the total number of the generators of the system, i=1, 2, ..., $N_g$, and $a_i$, $b_i$ and $c_i$ are the power generation coefficients of the generator set i; $P_{Gi}$ is the active power of the generator i; $f_0$ represents the minimum expected value of the total power generation cost of the system, $\Delta f$ represents the acceptable maximum increment of the total power generation cost of the system; $\delta_f$ is the flexible index of the power generation cost of the system, and the numerical area of the flexible index is as follows: $\delta_f \in [0,1]$.

According to the method for optimizing the flexible constraints of the electric power system, starting from the flexibly expressed power generation cost, the safety and reliability of system operation are considered as an invisible electric power source, and the comprehensive optimization of economic efficiency, safety, and reliability is taken as the ultimate purpose.

Step S2, a multi-dimensional flexible optimization model or a flexible power generation cost optimization model is selected according to the practical situation of the electric power system and the practical purpose of optimization; 1) the multi-dimensional flexible optimization model takes the operation cost flexibility, the node voltage flexibility, the generator power output flexibility and the power transmission line capacity flexibility of the electric power system into account simultaneously, and aims at comprehensive optimization of the economic efficiency, safety, and reliability of system operation, and the form of the multi-dimensional flexible optimization model is as follows:

$$\min f(\delta) = \delta_f^2 + \frac{1}{N}\sum_{k=1}^{N}\delta_{Lk}^2 - \frac{1}{N_g}\sum_{i=1}^{N_g}\delta_{Gi}^2 - \frac{1}{N}\sum_{k=1}^{N}\delta_{Vk}^2 - \frac{1}{L}\sum_{l=1}^{L}\delta_{Fl}^2 \qquad (2)$$

$$\text{s.t.} \sum_{i=1}^{N_g}(a_i P_{Gi}^2 + b_i P_{Gi} + c_i) = f_0 + \delta_f \Delta f$$

$$P_{Gk} - V_k \sum_{j \in k} V_j(G_{kj}\cos\theta_{kj} + B_{kj}\sin\theta_{kj}) = P_{Lk} - \delta_{Lk}\Delta P_{Lk}$$

$$Q_{Gk} - V_k \sum_{j \in k} V_j(G_{kj}\sin\theta_{kj} - B_{kj}\cos\theta_{kj}) = Q_{Lk} - \delta_{Lk}\Delta Q_{Lk}$$

$$P_{Gi}^{min} + \delta_{Gi}\Delta P_{Gi}^{min} \le P_{Gi} \le P_{Gi}^{max} - \delta_{Gi}\Delta P_{Gi}^{max}$$

$$Q_{Gi}^{min} + \delta_{Gi}\Delta Q_{Gi}^{min} \le Q_{Gi} \le Q_{Gi}^{max} - \delta_{Gi}\Delta Q_{Gi}^{max}$$

$$V_k^{min} + \delta_{Vk}\Delta V_k^{min} \le V_k \le V_k^{max} - \delta_{Vk}\Delta V_k^{max}$$

$$S_l \le S_l^{max} - \delta_{Fl}\Delta S_l^{max}$$

$$0 \le \delta_f, \delta_{Lk}, \delta_{Gi}, \delta_{Vk}, \delta_{Fl} \le 1$$

$$i = 1, 2, \ldots, N_g; k, j = 1, 2, \ldots, N; l = 1, 2, \ldots, L$$

wherein $\delta_{Lk}$ represents the flexible load index of a node k, $\delta_{Gi}$ represents the flexible index of the power output of generator i, $\delta_{Vk}$ represents the flexible voltage index of the node k, $\delta_{Fl}$ represents the flexible load flow index of the line l, N represents the total number of the nodes of the system, L represents the total number of the lines of the system, $P_{Gk}$ and $Q_{Gk}$ represent the active power and the reactive power of the node k, respectively, $P_{Lk}$ and $Q_{Lk}$ represent the active load and the reactive load of the node k, respectively, $V_k$ and $V_j$ represent the voltages of the nodes k and j, respectively, $G_{kj}$, $B_{kj}$ and $\theta_{kj}$ represent electric conductance, electrical susceptibility, and phase angle difference between the nodes k and j, respectively, $\Delta P_{Lk}$ and $\Delta Q_{Lk}$ represent the deviations of the active load and the reactive load of the node k, respectively, $P_{Gi}$, $P_{Gi}^{max}$ and $P_{Gi}^{min}$ represent the active power of the generator i and the upper and lower limits of the active power, respectively, $\Delta P_{Gi}^{max}$ and $\Delta P_{Gi}^{min}$ represent the maximum allowable threshold-crossing values of $P_{Gi}^{max}$ and $P_{Gi}^{min}$, respectively, $Q_{Gi}$, $Q_{Gi}^{max}$ and $Q_{Gi}^{min}$ represent the reactive power of the generator i and the upper and lower limits of the reactive power, respectively, $\Delta Q_{Gi}^{max}$ and $\Delta Q_{Gi}^{min}$ represent the maximum allowable threshold-crossing values of $Q_{Gi}^{max}$ and $Q_{Gi}^{min}$, respectively, $V_k$, $V_k^{max}$ and $V_k^{min}$ represent the voltage of the node k and the upper and lower limits of the voltage, respectively, $\Delta V_k^{max}$ and $\Delta V_k^{min}$ represent the maximum allowable threshold-crossing values of $V_k^{max}$ and $V_k^{min}$, respectively, $S_l$ and $S_l^{max}$ represent the load flow value and the threshold of the line l, respectively, and $\Delta S_l^{max}$ represents the maximum allowable threshold-crossing value of $S_l^{max}$.

In the practical problem, the flexible optimization model is generally simplified to obtain a new form as follows:

$$\min f(\delta) = \delta_f^2 - \delta_G^2 - \delta_V^2 - \delta_F^2 \quad (5)$$

$$\text{s.t.} \sum_{i=1}^{N_g}(a_i P_{Gi}^2 + b_i P_{Gi} + c_i) = f_0 + \delta_f \Delta f$$

$$P_{Gk} - V_k \sum_{j \in k} V_j(G_{kj}\cos\theta_{kj} + B_{kj}\sin\theta_{kj}) = P_{Lk}$$

$$Q_{Gk} - V_k \sum_{j \in k} V_j(G_{kj}\sin\theta_{kj} - B_{kj}\cos\theta_{kj}) = Q_{Lk}$$

$$P_{Gi}^{min} + \delta_G \Delta P_{Gi}^{min} \le P_{Gi} \le P_{Gi}^{max} - \delta_G \Delta P_{Gi}^{max}$$

$$Q_{Gi}^{min} + \delta_G \Delta Q_{Gi}^{min} \le Q_{Gi} \le Q_{Gi}^{max} - \delta_G \Delta Q_{Gi}^{max}$$

$$V_k^{min} + \delta_V \Delta V_k^{min} \le V_k \le V_k^{max} - \delta_V \Delta V_k^{max}$$

$$S_l \le S_l^{max} - \delta_F \Delta S_l^{max}$$

$$0 \le \delta_f, \delta_G, \delta_V, \delta_F \le 1$$

$$i = 1, 2, \ldots, N_g; k, j = 1, 2, \ldots, N; l = 1, 2, \ldots, L,$$

wherein $\delta_G$ represents a generator power output flexible index, $\delta_V$ represents a flexible node voltage index, and $\delta_F$ represents a flexible line load flow index. In the multi-dimensional flexible optimization model, the value of the total power generation cost of the system is associated with the value of the constraint boundary of the system, and the two values restrict each other. In other words, the larger the constraint domain of the system is, the better the economic efficiency of system operation is. However, when the economic efficiency of system operation cannot be improved obviously by virtue of the expansion of the constraint domain of the system, the operation constraint domain of the system is reduced to maintain more system operation safety margin. Meanwhile, the value of each flexible index reflects the operating state of the system: (1) the smaller the system power generation cost flexible index $\delta_f$ is, the smaller the total power generation cost of the system is and also the better economic efficiency of the system is; (2) the smaller the flexible load index $\delta_{Lk}$ is, the smaller the load curtailment power of the system and the lower the influence on power users; (3) the larger the generator power output flexible index $\delta_G$, the flexible node voltage index $\delta_V$ and the flexible line load flow index $\delta_F$ are, the larger the system operation safety margin is and also the higher the safety and reliability of the system are.

2) The flexible power generation cost optimization model only gives consideration to the power generation cost flexibility of the system, rigid constraints are adopted, and the form of the flexible power generation cost optimization model is as follows:

$$\min f(\delta) = \delta_f^2 \quad (3)$$

$$\text{s.t.} \sum_{i=1}^{N_g}(a_i P_{Gi}^2 + b_i P_{Gi} + c_i) = f_0 + \delta_f \Delta f$$

$$P_{Gk} - V_k \sum_{j \in k} V_j(G_{kj}\cos\theta_{kj} + B_{kj}\sin\theta_{kj}) = P_{Lk}$$

$$Q_{Gk} - V_k \sum_{j \in k} V_j(G_{kj}\sin\theta_{kj} - B_{kj}\cos\theta_{kj}) = Q_{Lk}$$

$$P_{Gi}^{min} \le P_{Gi} \le P_{Gi}^{max}$$

$$Q_{Gi}^{min} \le Q_{Gi} \le Q_{Gi}^{max}$$

$$V_k^{min} \le V_k \le V_k^{max}$$

$$S_l \le S_l^{max}$$

$$0 \le \delta_f \le 1$$

$$i = 1, 2, \ldots, N_g; k, j = 1, 2, \ldots, N; l = 1, 2, \ldots, L.$$

The model is equivalent to the traditional optimal load flow model of the electric power system; the traditional optimal load flow model of the electric power system is a special case of a one-dimensional flexible optimization problem. If the traditional optimal load flow model of the electric power system is soluble, the multi-dimensional flexible optimization model is soluble, and furthermore, the flexible power generation cost optimization model is soluble.

3) When the original optimal load flow problem is insoluble, the optimal load curtailment model is utilized so that the system is recovered to the feasible region, and in the form as follows:

$$\min \sum_{k=1}^{N} \delta_{Lk} \Delta P_{Lk} \quad (4)$$

$$\text{s.t.} \; P_{Gk} - V_k \sum_{j \in k} V_j(G_{kj}\cos\theta_{kj} + B_{kj}\sin\theta_{kj}) = P_{Lk} - \delta_{Lk} \Delta P_{Lk}$$

$$Q_{Gk} - V_k \sum_{j \in k} V_j(G_{kj}\sin\theta_{kj} + B_{kj}\cos\theta_{kj}) = Q_{Lk} - \delta_{Lk} \Delta Q_{Lk}$$

$$P_{Gi}^{min} \le P_{Gi} \le P_{Gi}^{max}$$

$$Q_{Gi}^{min} \le Q_{Gi} \le Q_{Gi}^{max}$$

$$V_k^{min} \le V_k \le V_k^{max}$$

$$S_l \le S_l^{max}$$

$$i = 1, 2, \ldots, N_g; k, j = 1, 2, \ldots, N; l = 1, 2, \ldots, L.$$

Under the circumstance where the original optimal load flow problem is insoluble, the flexibility of the load is simply considered instead of the economic efficiency of system operation and the flexibility of the inequality constraints; in other words, the load curtailment measure must be taken so that the system can be recovered to the feasible region at the minimum load loss cost.

Step S3, the operating conditions, including a power grid structure, and voltages and powers of the generators, of the electric power system are determined.

Step S4, load flow calculation is carried out based on the operating conditions of the electric power system to obtain the active power and the reactive power of each bus, the voltages of the nodes, and the electric conductance, the electric susceptibility, and the phase angle difference between nodes.

Step S5, if the load flow calculation is successful, corresponding optimization calculation is carried out according to the flexible multi-dimensional or flexible power generation cost model selected in the step S2 to obtain a comprehensive flexible optimization result or the optimal power generation cost, namely the optimal total power generation cost f' of the electric power system, and the state controlled power grid operating variables such as the active power, the reactive power and the flexible index when the optimal power generation cost is optimal; if the load flow calculation fails, corresponding optimization calculation is carried out according to the optimal load curtailment model to obtain the optimal load curtailment and the power grid operating state controlled variables such as the active power, the reactive power and the flexible index at this moment, and wherein the optimization calculation of the multi-dimensional flexibility, the power generation cost flexibility or the optimal load curtailment includes the following specific steps of 501, constructing a Lagrange objective function according to the corresponding multi-dimensional flexible, power generation cost flexible or optimal load curtailment model, 502, obtaining a Kuhn-Tucker condition corresponding to the optimal solution of the Lagrange objective function, and 503, solving by virtue of a newton method to obtain the optimal solution of the model.

The concept of electric power system flexibility is introduced into the method for optimizing the flexible constraints of the electric power system, the multi-dimensional flexible, power generation cost flexible and optimal load curtailment models are constructed while the safety and reliability of system operation are guaranteed, the constraint boundary of the system is expanded rationally and the economic efficiency of system operation is improved to an utmost extent, and meanwhile, the bottleneck affecting the economic efficiency of system operation can be found out based on the optimization result, and therefore, reference can be provided for upgrading and modifying the power grid.

The necessary data of an electric power system for the application of this disclosure are as follows.

1) The voltage level of the electric power system.
2) Bus data include; bus number; bus type (namely PQ, PV or slack bus); real and reactive load power; reactive compensation capacity; upper and lower voltage constraints.
3) Generator data include: bus number; upper and lower constraints for both real and reactive power outputs; operating economy parameters.
4) Transmission line data include: from bus and to bus number; resistance, reactance, conductance and susceptance of the line; current constraint.

What is claimed is:

1. A method for optimizing flexible constraints of an electric power system, comprising:
expressing a total power generation cost f' of the electric power system by a sum of quadratic functions of active power outputs of all generator sets in the system in a flexible formula as follows:

$$f' = \sum_{i=1}^{N_g} (a_i P_{Gi}^2 + b_i P_{Gi} + c_i) = f_0 + \delta_f \Delta f, \quad (1)$$

wherein $N_g$ represents a total number of generators of the system, i=1, 2, ..., $N_g$, and $a_i$, $b_i$ and $c_i$ are power generation coefficients of a generator set i; $P_{Gi}$ is an active power of the generator i; $f_0$ represents a minimum expected value of the total power generation cost of the system, $\Delta f$ represents an acceptable maximum increment of the total power generation cost of the system; $\delta_f$ is a flexible index of a power generation cost of the system, and a numerical area of the flexible index is as follows: $\delta_f \in [0,1]$;

selecting a multi-dimensional flexible optimization model or a flexible power generation cost optimization model according to a practical situation of the electric power system and a practical purpose of optimization;

determining an operating conditions, including a power grid structure, and voltages and powers of the generators, of the electric power system;

carrying out load flow calculation based on the operating conditions of the electric power system; and carrying out corresponding optimization calculation according to the flexible multi-dimensional or flexible power generation cost model selected in the selecting step to obtain a comprehensive flexible optimization result or an optimal power generation cost, if the load flow calculation is successful, and if the load flow calculation fails, carrying out corresponding optimization calculation according to an optimal load curtailment model to obtain an optimal load curtailment.

2. The method of claim 1, wherein the multi-dimensional flexible optimization model is as follows:

$$\min f(\delta) = \delta_f^2 + \frac{1}{N}\sum_{k=1}^{N} \delta_{Lk}^2 - \frac{1}{N_g}\sum_{i=1}^{N_g} \delta_{Gi}^2 - \frac{1}{N}\sum_{k=1}^{N} \delta_{Vk}^2 - \frac{1}{L}\sum_{l=1}^{L} \delta_{Fl}^2 \quad (2)$$

$$\text{s.t.} \sum_{i=1}^{N_g} (a_i P_{Gi}^2 + b_i P_{Gi} + c_i) = f_0 + \delta_f \Delta f$$

$$P_{Gk} - V_k \sum_{j \in k} V_j (G_{kj}\cos\theta_{kj} + B_{kj}\sin\theta_{kj}) = P_{Lk} - \delta_{Lk} \Delta P_{Lk}$$

$$Q_{Gk} - V_k \sum_{j \in k} V_j (G_{kj}\sin\theta_{kj} - B_{kj}\cos\theta_{kj}) = Q_{Lk} - \delta_{Lk} \Delta Q_{Lk}$$

$$P_{Gi}^{min} + \delta_{Gi} \Delta P_{Gi}^{min} \le P_{Gi} \le P_{Gi}^{max} - \delta_{Gi} \Delta P_{Gi}^{max}$$

$$Q_{Gi}^{min} + \delta_{Gi} \Delta Q_{Gi}^{min} \le Q_{Gi} \le Q_{Gi}^{max} - \delta_{Gi} \Delta Q_{Gi}^{max}$$

$$V_k^{min} + \delta_{Vk} \Delta V_k^{min} \le V_k \le V_k^{max} - \delta_{Vk} \Delta V_k^{max}$$

$$S_l \le S_l^{max} - \delta_{Fl} \Delta S_l^{max}$$

$$0 \le \delta_f, \delta_{Lk}, \delta_{Gi}, \delta_{Vk}, \delta_{Fl} \le 1$$

$$i = 1, 2, \ldots, N_g; k, j = 1, 2, \ldots, N; l = 1, 2, \ldots, L$$

wherein $\delta_{Lk}$ represents a flexible load index of a node k, $\delta_{Gi}$ represents a flexible index of a power output of generator i, $\delta_{Vk}$ represents a flexible voltage index of the node k, $\delta_{Fl}$ represents the flexible load flow index of line l, N represents the total number of the nodes of the system, L represents a total number of lines of the system, $P_{Gk}$ and $Q_{Gk}$ represent an active power and a reactive power of the node k, respectively, $P_{Lk}$ and $Q_{Lk}$, represent an active load and a reactive load of the node k, respectively, $V_k$ and $V_j$ represent voltages of the nodes k and j, respectively, $G_{kj}$, $B_{kj}$ and $\theta_{kj}$ represent electric conductance, electrical susceptibility, and phase angle difference between the nodes k and j, respectively, $\Delta P_{Lk}$ and $\Delta Q_{Lk}$ represent deviations of the active load and the reactive load of the node k, respectively, $P_{Gi}$, $P_{Gi}^{max}$ and $P_{Gi}^{min}$ represent the active power of the generator i and an upper and a lower limits of the active power, respectively, $\delta P_{Gi}^{max}$ and $\delta P_{Gi}^{min}$ represent a maximum allowable threshold-crossing values of $P_{Gi}^{max}$ and $P_{Gi}^{min}$, respectively, $Q_{Gi}$, $Q_{Gi}^{max}$ and $Q_{Gi}^{min}$ represent a reactive power of the generator i and an upper and a lower limits of the reactive power, respectively, $\delta Q_{Gi}^{max}$ and $\delta Q_{Gi}^{min}$ represent a maximum allowable threshold-crossing values of, $Q_{Gi}^{max}$ and $Q_{Gi}^{min}$, respectively, $V_k$, $V_k^{max}$ and $V_k^{min}$ represent a voltage of the node k and an upper and a lower limits of the voltage, respectively, $\delta V_k^{max}$ and $\delta V_k^{min}$ represent a maximum allowable threshold-crossing values of, $V_k^{max}$ and $V_k^{min}$ respectively, $S_l$ and $S_l^{max}$ represent a load flow value and a threshold of the line l, respectively, and $\delta S_l^{max}$ represents a maximum allowable threshold-crossing value of $S_l^{max}$.

3. The method of claim 1, wherein the flexible power generation cost optimization model is as follows:

$$\min f(\delta) = \delta_f^2 \quad (3)$$

$$\text{s.t.} \sum_{i=1}^{N_g} (a_i P_{Gi}^2 + b_i P_{Gi} + c_i) = f_0 + \delta_f \Delta f$$

$$P_{Gk} - V_k \sum_{j \in k} V_j(G_{kj}\cos\theta_{kj} + B_{kj}\sin\theta_{kj}) = P_{Lk}$$

$$Q_{Gk} - V_k \sum_{j \in k} V_j(G_{kj}\sin\theta_{kj} - B_{kj}\cos\theta_{kj}) = Q_{Lk}$$

$$P_{Gi}^{min} \leq P_{Gi} \leq P_{Gi}^{max}$$

$$Q_{Gi}^{min} \leq Q_{Gi} \leq Q_{Gi}^{max}$$

$$V_k^{min} \leq V_k \leq V_k^{max}$$

$$S_l \leq S_l^{max}$$

$$0 \leq \delta_f \leq 1$$

$$i = 1, 2, \ldots, N_g; k, j = 1, 2, \ldots, N; l = 1, 2, \ldots, L,$$

wherein N represents a total number of the nodes of the system, L represents a total number of lines of the system, $P_{Gk}$ and $Q_{Gk}$ represent an active power and a reactive power of a node k, respectively, $P_{Lk}$ and $Q_{Lk}$ represent an active load and a reactive load of the node k, respectively, $V_k$ and $V_j$ represent voltages of the nodes k and j, respectively, $G_{kj}$, $B_{kj}$ and $\theta_{kj}$ represent electric conductance, electrical susceptibility, and phase angle difference between the nodes k and j, respectively, $P_{Gi}$, $P_{Gi}^{max}$ and $P_{Gi}^{min}$ represent an active power of the generator i and an upper and a lower limits of the active power, respectively, $Q_{Gi}$, $Q_{Gi}^{max}$ and $Q_{Gi}^{min}$ represent a reactive power of the generator i and an upper and a lower limits of the reactive power, respectively, $V_k$, $V_k^{max}$ and $V_k^{min}$ represents a voltage of the node k and an upper and a lower limits of the voltage, respectively, and $S_l$ and $S_l^{max}$ represent a load flow value and a threshold of the line l, respectively.

4. The method of claim 1, wherein the optimal load curtailment is as follows:

$$\min \sum_{k=1}^{N} \delta_{Lk} \Delta P_{Lk} \quad (4)$$

$$\text{s.t.} \quad P_{Gk} - V_k \sum_{j \in k} V_j(G_{kj}\cos\theta_{kj} + B_{kj}\sin\theta_{kj}) = P_{Lk} - \delta_{Lk}\Delta P_{Lk}$$

$$Q_{Gk} - V_k \sum_{j \in k} V_j(G_{kj}\sin\theta_{kj} - B_{kj}\cos\theta_{kj}) = Q_{Lk} - \delta_{Lk}\Delta Q_{Lk}$$

$$P_{Gi}^{min} \leq P_{Gi} \leq P_{Gi}^{max}$$

$$Q_{Gi}^{min} \leq Q_{Gi} \leq Q_{Gi}^{max}$$

$$V_k^{min} \leq V_k \leq V_k^{max}$$

$$S_l \leq S_l^{max}$$

$$i = 1, 2, \ldots, N_g; k, j = 1, 2, \ldots, N; l = 1, 2, \ldots, L,$$

wherein $\delta_{LK}$ represents a flexible load index of a node k, N represents a total number of nodes of the system, L represents a total number of lines of the system, $P_{Gk}$ and $Q_{Gk}$ represent an active power and a reactive power of the node k, respectively, $P_{Lk}$ and $Q_{Lk}$ represent an active load and a reactive load of the node k, respectively, $V_k$ and $V_j$ represent voltages of the nodes k and j, respectively, and $G_{kj}$, $B_{kj}$ and $\theta_{kj}$ represent electric conductance, electrical susceptibility and phase angle difference between the nodes k and j, respectively, $\Delta P_{Lk}$ and $\Delta Q_{Lk}$ represent deviations of the active load and the reactive load of the node k, respectively, $P_{Gi}$, $P_{Gi}^{max}$ and $P_{Gi}^{min}$ represent an active power of the generator i and an upper and a limits of the active power, respectively, $Q_{Gi}$, $Q_{Gi}^{max}$ and $Q_{Gi}^{min}$ represent a reactive power of the generator i and an upper and a lower limits of the reactive power, respectively, $V_k$, $V_k^{max}$ and $V_k^{min}$ represent a voltage of the node k and an upper and a lower limits of the voltage, respectively, and $S_l$ and $S_l^{max}$ represent a load flow value and a threshold of the line l, respectively.

5. The method of claim 1, wherein the corresponding optimization specifically comprises:
constructing a Lagrange objective function according to the corresponding multi-dimensional flexible, power generation cost flexible or optimal load curtailment model,
obtaining a Kuhn-Tucker condition corresponding to the optimal solution of the Lagrange objective function, and
solving by virtue of a newton method to obtain the optimal solution of the model.

* * * * *